(12) United States Patent
Han et al.

(10) Patent No.: US 7,447,515 B2
(45) Date of Patent: Nov. 4, 2008

(54) APPARATUS AND METHOD FOR TRANSMITTING CONTROL INFORMATION IN A MOBILE COMMUNICATION SYSTEM

(75) Inventors: Jung-Hoon Han, Seoul (KR); Ju-Ho Lee, Suwon-si (KR); Joon-Young Cho, Suwon-si (KR); Youn-Hyoung Heo, Gyeonggi-do (KR); Eun-Jung Kim, Suwon-si (KR); Young-Seok Lim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 813 days.

(21) Appl. No.: 11/055,055

(22) Filed: Feb. 11, 2005

(65) Prior Publication Data

US 2005/0181816 A1    Aug. 18, 2005

(30) Foreign Application Priority Data

Feb. 13, 2004   (KR) ...................... 10-2004-0009784

(51) Int. Cl.
*H04Q 7/20*   (2006.01)
*H04Q 7/32*   (2006.01)

(52) U.S. Cl. .................. 455/522; 455/517; 455/69; 455/68; 455/422.1; 455/70; 370/328; 370/329

(58) Field of Classification Search ............... 455/522, 455/517, 507, 500, 68, 69, 70, 422.1, 426.1, 455/426.2, 550.1, 403, 450, 509, 412.1, 412.2, 455/561; 370/328, 329
See application file for complete search history.

(56) References Cited

U.S. PATENT DOCUMENTS

2004/0203987 A1*  10/2004  Butala .................. 455/522
2006/0166690 A1*  7/2006   Nishio et al. ............ 455/522

* cited by examiner

*Primary Examiner*—Keith T Ferguson
(74) *Attorney, Agent, or Firm*—Roylance, Abrams, Berdo & Goodman, LLP

(57) ABSTRACT

An apparatus and method for transmitting a control signal using a symbol or bit pattern of an existing pilot channel, instead of using the time multiplexing method in the separate code channel or the existing physical channel, and reducing an error rate while a reception side detects the control signal are provided. For that purpose, a transmission side allocates transmission power corresponding to a pilot pattern determined according to the control information. A corresponding reception side detects control information based on a pilot pattern of pilot bits inserted in a dedicated physical channel (DPCH) and generates transmit power control (TPC) bits referring to a target reception power which is set based on the control information.

19 Claims, 6 Drawing Sheets

APPARATUS AND METHOD FOR TRANSMITTING CONTROL INFORMATION IN A MOBILE COMMUNICATION SYSTEM

PRIORITY

This application claims the benefit under 35 U.S.C. § 119 (a) to an application entitled "Apparatus and Method for Transmitting Control Information in a Mobile Communication System" filed in the Korean Intellectual Property Office on Feb. 13, 2004 and assigned Ser. No. 2004-9784, the entire contents of which are incorporated herein by reference.

BACKGROUND OF THE INVENTION

1. Field of the Invention

The present invention relates generally to a power control apparatus and method in a mobile communication system. In particular, the present invention relates to a power control apparatus and method for transmitting control information using a pilot pattern in a mobile communication system.

2. Description of the Related Art

Code Division Multiple Access (CDMA) mobile communication systems have been developing from an IS-95 standard for mainly supporting transmission/reception of voice signals into an IMT-2000 standard capable of supporting not only the voice signal transmission but also high-speed data transmission. The IMT-2000 standard aims at providing high-quality voice service, moving image service, Internet search service, and the like.

In the mobile communication system, various schemes for servicing such information as voice and data are being realized. A conventional scheme is a High Speed Downlink Packet Access (HSDPA) scheme in a Universal Mobile Telecommunications System (UMTS) communication system.

Generally, the HSDPA scheme refers to a data transmission scheme, including a high speed-downlink shared channel (HS-DSCH), which a downlink data channel for supporting high-speed downlink packet data transmission, and its associated control channels. In order to support the high-speed downlink packet data service, an Adaptive Modulation and Coding (AMC) scheme, a Hybrid Automatic Retransmission Request (HARQ) scheme, and a Fast Cell Select (FCS) scheme have been proposed. A description will now be made of the HARQ scheme, especially, an n-channel Stop And Wait HARQ (n-channel SAW HARQ) scheme.

In the HARQ scheme, the following two counterplans have recently been applied to increase transmission efficiency of an Automatic Retransmission Request (ARQ) scheme. According to a first counterplan, retransmission request and Acknowledgement/Negative-Acknowledgement (ACK/NACK) are exchanged between a user equipment (UE) and a Node B. According to a second counterplan, a UE temporarily stores defective data and combines the stored defective data with retransmitted data of the corresponding defective data before decoding. The high-speed downlink packet data service method has introduced the n-channel SAW HARQ scheme in order to compensate for the defect of the conventional Stop and Wait ARQ (SAW ARQ) scheme. In the case of the SAW ARQ scheme, next packet data cannot be transmitted before an ACK for previous packet data is received. Therefore, in some cases, a UE needs to wait for an ACK even though it can currently transmit packet data.

In the n-channel SAW HARQ scheme, a UE continuously transmits a plurality of data packets before it receives the ACK for a previous data packet, thereby increasing channel efficiency. That is, if each of n logical channels established between a UE and a Node B can be identified by a specific time or its unique channel number, the UE receiving packet data at a specific time can determine a channel over which the packet data was received. Therefore, the UE can take necessary measures such as an operation of reordering data packets in their right reception order and an operation of soft-combining the corresponding data packets.

Table 1 and Table 2 below illustrate downlink and uplink physical channels used in a mobile communication system, respectively.

TABLE 1

| Downlink Physical Channels | Functions |
| --- | --- |
| DPDCH | Dedicated Physical Data Channel |
| DPCCH | Dedicated Physical Control Channel |
| CPICH | Common Pilot Channel |
| P-CCPCH | Primary Common Control Physical Channel |
| S-CCPCH | Secondary Common Control Physical Channel |
| SCH | Synchronization Channel |
| PDSCH | Physical Downlink Shared Channel |
| AICH | Acquisition Indicator Channel |
| AP-AICH | Access Preamble Acquisition Indicator Channel |
| PICH | Paging Indicator Channel |
| CSICH | CPCH (Common Packet Channel) Status Indicator Channel |
| CD/CA-ICH | CPCH Collision Detection/Channel Assignment Indicator Channel |
| HS-PDSCH | High Speed-Physical Downlink Shared Control Channel |
| HS-SCCH | High Speed-Shared Control Channel |

TABLE 2

| Uplink Physical Channels | Functions |
| --- | --- |
| DPDCH | Dedicated Physical Data Channel |
| DPCCH | Dedicated Physical Control Channel |
| PRACH | Physical Random Access Channel |
| PCPCH | Physical Common Packet Channel |
| HS-DPCCH | High Speed-Dedicated Physical Control Channel |

The downlink physical channels are distinguished using orthogonal variable spreading factor (OVSF) codes.

In order to support a packet data service with an uplink in a mobile communication system, a similar scheme to the scheme for supporting a packet data service with a downlink can be introduced. Therefore, in order to constitute a packet data service in an uplink, it is necessary to transmit packet data of the uplink and control information of the downlink. The control information refers to, for example, "ACK/NACK information." A scheme for transmitting control information including the ACK/NACK information using the downlink is classified into a scheme for transmitting the control information over an existing physical channel after time multiplexing, and a scheme for transmitting the control information over the existing physical channel after code multiplexing.

The time multiplexing scheme and the code multiplexing scheme will be described herein below with reference to FIGS. 1 and 2, respectively.

FIG. 1 illustrates a structure of a downlink physical channel for time-multiplexing control information for packet data transmission with data before transmission. The types and functions of physical channels in the downlink have been illustrated in Table 1. Referring to FIG. 1, the control information is time-multiplexed to a space generated by puncturing data on a physical channel, before being transmitted. That is, the physical channel includes the control information in a partial duration where no data is transmitted, before being transmitted.

FIG. 2 illustrates a structure of a downlink physical channel for code-multiplexing control information for packet data transmission with an existing physical channel before transmission. Referring to FIG. 2, a separate physical channel for transmitting control information is generated in addition to an existing physical channel, and the control information or packet data is transmitted over the generated physical channel. The existing physical channel and a physical channel recently defined for transmitting the control information are separated using OVSF codes. Also, the physical channel for transmitting the control information can include control information indicating an information transmission channel.

The time multiplexing scheme illustrated in FIG. 1 should include control information for packet data transmission in a partial duration of an existing physical channel, causing a possible loss of data transmitted over the existing physical channel. Although the code multiplexing scheme illustrated in FIG. 2 prevents a data loss in the existing physical channel, it needs additional power and OVSF code for the physical channel generated to transmit the control information.

Therefore, the present invention proposes a scheme for transmitting control information using the existing physical channel. Some types of control information for packet data transmission do not have a large amount of information, so that they can be transmitted through a modification of the existing physical channel. Such a method does not need additional codes and power for transmitting control information, and minimizes the influence on performance of the existing physical channel. For example, in an asynchronous mobile communication system, the method can transmit control information using a pilot duration existing in a physical channel. A dedicated physical control channel (DPCCH) can be used as the physical channel.

However, in the forgoing scheme using a pilot duration, if the pilot duration is not long enough, an error rate will probably increase when a reception side extracts control information. Because the occurrence of an error causes mis-operations, it is necessary to reduce the error rate.

SUMMARY OF THE INVENTION

It is, therefore, an object of the present invention to provide an apparatus and method for reducing an error rate during control information detection in a mobile communication system that transmits/receives control information using a pilot field.

It is another object of the present invention to provide an apparatus and method for preventing mis-operations while performing power control using a pilot signal thereby improving power control performance in a mobile communication system that transmits control information using a pilot field.

It is further another object of the present invention to provide an apparatus and method for determining different transmission powers for transmission of a dedicated physical channel according to types of control information.

It is yet another object of the present invention to provide a signaling method in which additional power offsets separately allocated according to types of control information can be shared in a mobile communication system.

It is still another object of the present invention to provide an apparatus and method in which different power offsets are used according to types of control information in a transceiver.

In accordance with a first aspect of the present invention, there is provided a method for controlling transmission power in a transmitter of a mobile communication system that inserts a pilot pattern selected based on control information into a pilot field of a physical channel before transmission. The method comprises the steps of selecting an additional power offset corresponding to the control information; allocating transmission power based on the additional power offset; and transmitting a signal on the physical channel with the transmission power.

In accordance with a second aspect of the present invention, there is provided a method for performing power control by a receiver in a mobile communication system in which a pilot pattern selected based on control information is inserted into a pilot field of a physical channel before being transmitted. The method comprises the steps of extracting control information based on the pilot pattern inserted into the pilot field of a signal on the physical channel; selecting an additional power offset corresponding to the control information, and setting a target reception power based on the selected additional power offset; and comparing a reception power measured based on the physical channel signal with the target reception power, and generating a transmit power control (TPC) bit according to the comparison result.

In accordance with a third aspect of the present invention, there is provided an apparatus for controlling transmission power of a signal on a physical channel in a transmitter of a mobile communication system that inserts a pilot pattern selected based on control information into a pilot field of the physical channel before transmission. The apparatus comprises a power offset generator for selecting an additional power offset corresponding to the control information among selectable additional power offsets, and generating a power offset based on the selected additional power offset; and a transmission power allocater for allocating transmission power based on the power offset.

In accordance with a fourth aspect of the present invention, there is provided an apparatus for performing power control based on a signal on a physical channel ( ) by a receiver in a mobile communication system in which a pilot pattern selected based on control information is inserted into a pilot field of the physical channel before being transmitted. The apparatus comprises a control information extractor for extracting control information based on the pilot pattern inserted into the pilot field of the physical channel signal; and a physical channel reception power measurement and transmit power control (TPC) bit generation part for setting a target reception power based on an additional power offset selected based on the control information, comparing a reception power measured based on the physical channel signal with the target reception power, and generating a TPC bit according to the comparison result.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

An embodiment of the present invention will now be described in detail with reference to the accompanying drawings. In the following description, a detailed description of known functions and configurations incorporated herein has been omitted for conciseness.

A. Outline of the Embodiment of the Invention

The embodiment of the present invention proposes an apparatus and method for transmitting a control signal using a symbol or bit pattern of an existing pilot channel, instead of using the time multiplexing method in the separate code channel or the existing physical channel, and reducing an error rate while a reception side detects the control signal. In performing power control using a pilot signal, the embodiment of the present invention can increase power control performance. An embodiment of the present invention will be described with reference to a dedicated physical channel (DPCH) having a pilot field from among physical channels used in an asynchronous mobile communication system. For that purpose, in inserting, in a DPCH, pilot bits based on a pilot pattern determined according to control information and modulating the pilot bit-inserted DPCH, a transmission side allocates transmission power corresponding to the control information. A corresponding reception side detects control information based on a pilot pattern of pilot bits inserted in the DPCH and generates Transmit Power Control (TPC) bits referring to a target reception power which is set based on the control information. That is, in the embodiment of the present invention, adaptive power offsets can be used based on control information. Here, the control information is defined as control information for transmitting packet data. Therefore, for implementation of the embodiment of the present invention, power offset values that can be selected based on the control information should be previously agreed upon between the transmission side and the reception side.

Figure 1:
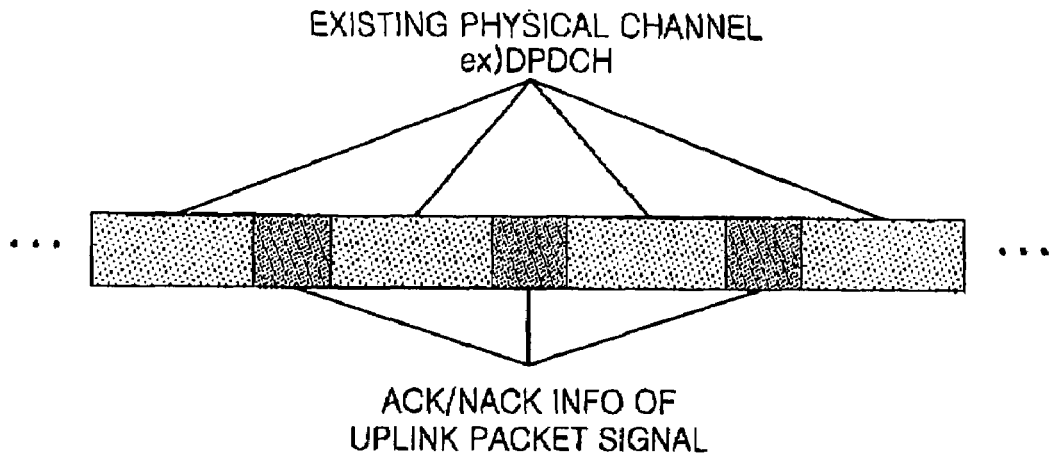
FIG. 1 is a diagram illustrating a conventional downlink physical channel for time-multiplexing control information with data before transmission according to the prior art.
Figure 2:
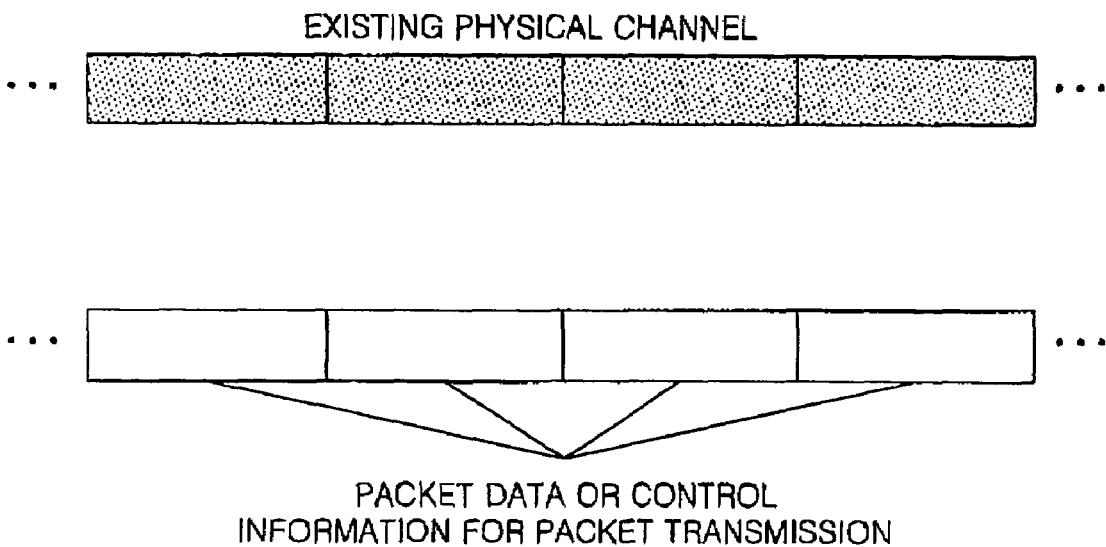
FIG. 2 is a diagram illustrating a conventional downlink physical channel for code-multiplexing control information with a physical channel before transmission according to the prior art.
Figure 3:
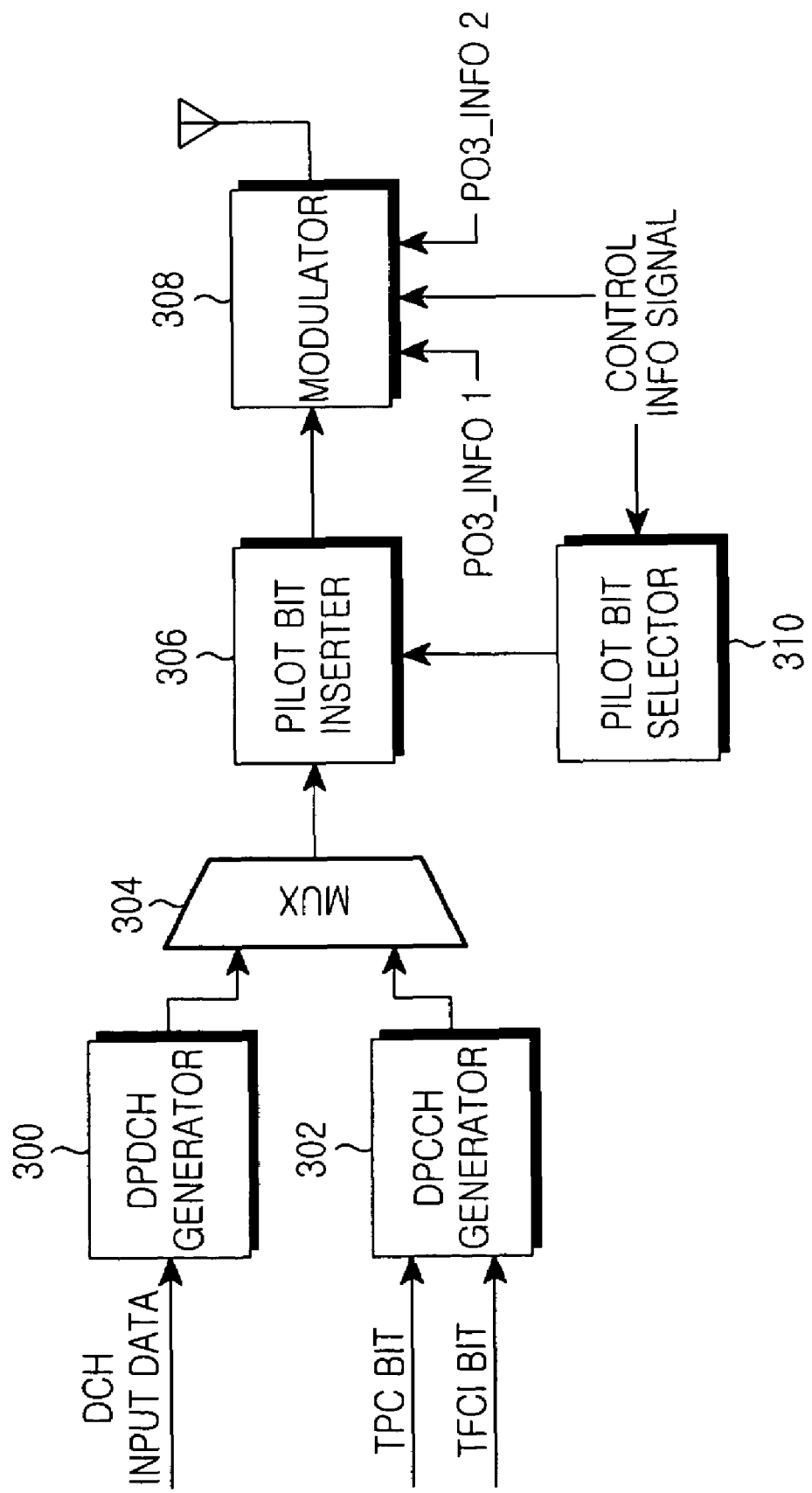
FIG. 3 is a block diagram illustrating a structure of a transmitter according to an embodiment of the present invention.
Figure 4:
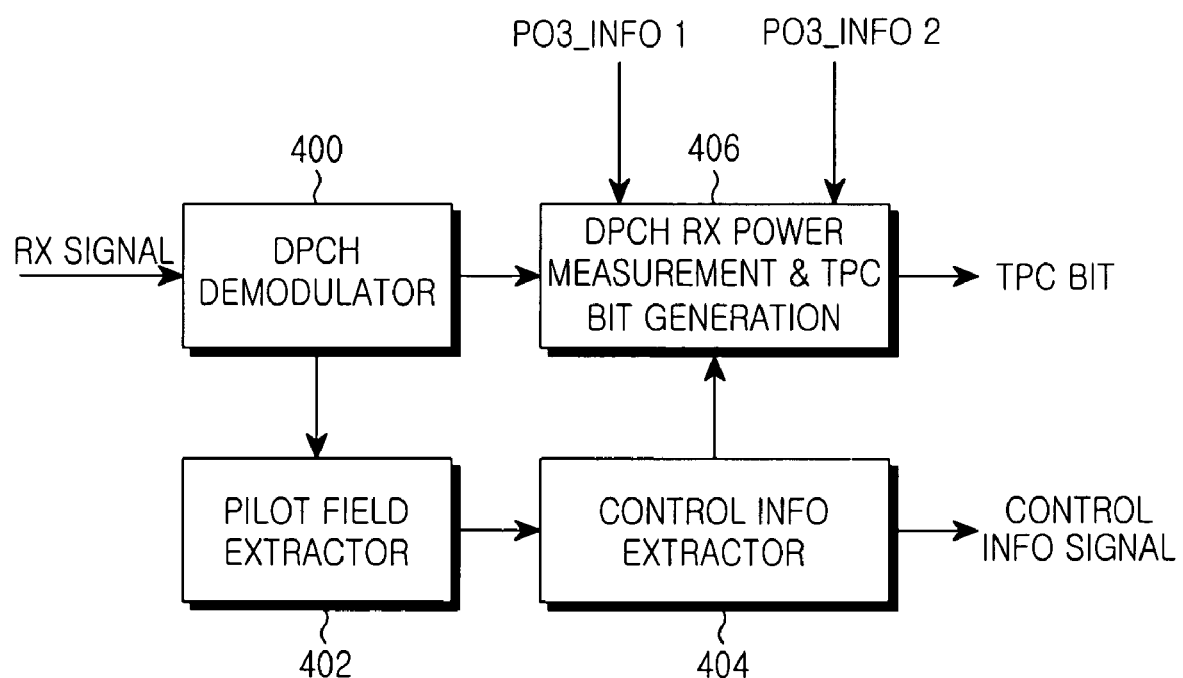
FIG. 4 is a block diagram illustrating a structure of a receiver according to an embodiment of the present invention.
Figure 5:
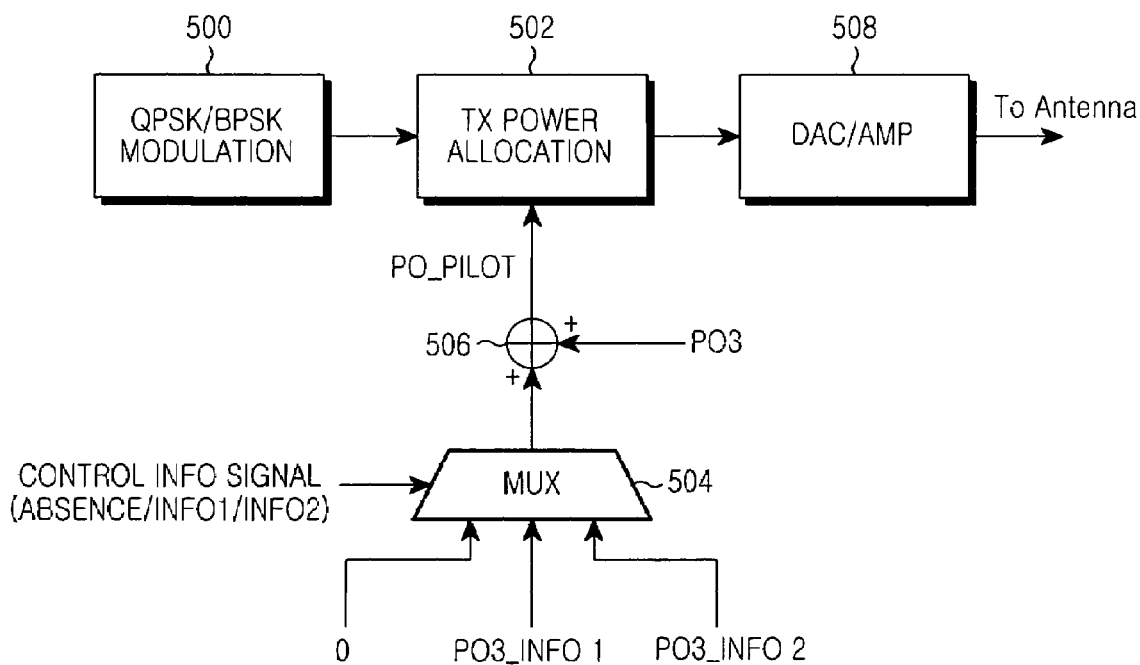
FIG. 5 is a detailed block diagram illustrating a structure of a modulator illustrated in FIG. 3.
Figure 6:
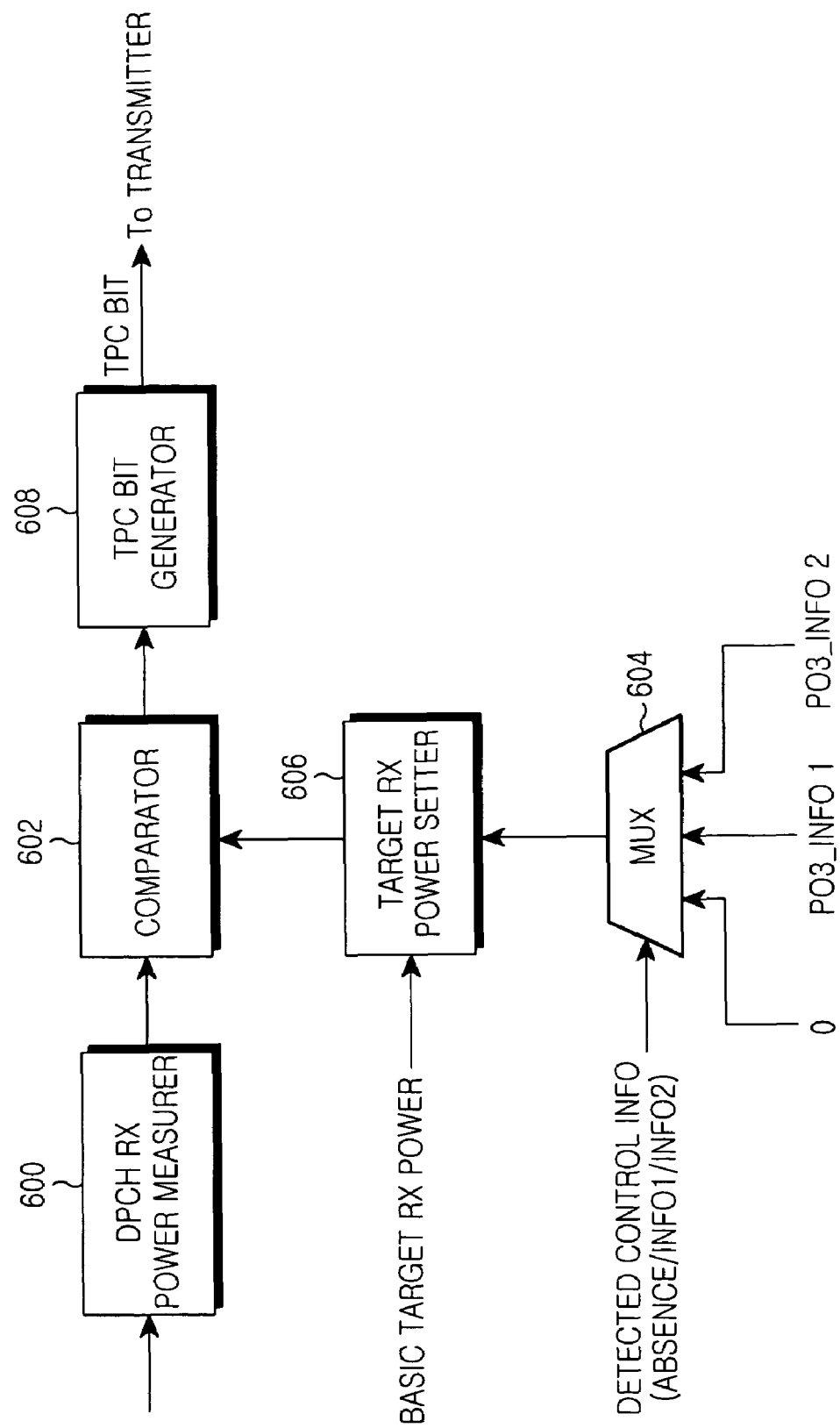
FIG. 6 is a detailed block diagram illustrating a structure of a dedicated physical channel (DPCH) reception power measurement and transmit power control (TPC) bit generation part illustrated in FIG. 4.

A detailed description of an embodiment of the present invention will be separated herein into a detailed description of a structure and operation of a transmitter and a detailed description of a structure and operation of a receiver. FIGS. 3 and 5 are diagrams illustrating a structure of a transmitter according to an embodiment of the present invention, and FIGS. 4 and 6 are diagrams illustrating a structure of a receiver according to an embodiment of the present invention. Also, a detailed description will be made of a signaling operation performed such that power offset values that can be selected based on control information can be shared by the transmission side and the reception side.

B. Embodiment of the Invention

B-1. Structure and Operation of Transmitter

With reference to an accompanying drawing, a detailed description will now be made of a structure and operation of a transmitter according to an embodiment of the present invention.

FIG. 3 is a block diagram illustrating a structure of a transmitter according to an embodiment of the present invention. The transmitter comprises a dedicated physical data channel (DPDCH) generator, a dedicated physical control channel (DPCCH) generator, a multiplexer (MUX), a pilot bit inserter, a modulator, and a pilot bit generator.

Referring to FIG. 3, a Node B, receiving uplink packet data from a UE, demodulates the received packet data. The Node B generates control information to be provided to the UE according to the modulation result. The generated control information is delivered to a pilot bit generator 310 and a modulator 308. The pilot bit generator 310 generates pilot bits having a particular pilot pattern determined based on the control information. To this end, the pilot bit generator 310 should previously know all pilot patterns that can be determined based on the control information. Here, the pilot patterns are orthogonal with one another. The pilot bits generated by the pilot bit generator 310 are delivered to a pilot bit inserter 306.

A DPDCH generator 300 receives DCH data and generates a DPDCH signal by the received DCH data. The generated DPDCH signal is delivered to a multiplexer 304. A DPCCH generator 302 receives TPC bits and Transport Format Combination Indicator (TFCI) bits, and generates a DPCCH signal via the TPC bits and the TFCI bits. The generated DPCCH signal is delivered to the multiplexer 304. The multiplexer 304 generates a DPCH signal by multiplexing the DPDCH signal and the DPCCH signal.

FIG. 5 is a detailed block diagram illustrating a structure of the modulator 305 illustrated in FIG. 3. The modulator 305 comprises a modulator 500, a transmission power allocater 502, a multiplexer 504, an adder 506, and a digital-to-analog converter and amplifier (DAC/AMP) 508.

Referring to FIG. 5, a pilot bit-inserted DPCH signal is input to the modulator 500. The modulator 500 modulates the DPCH signal via a predetermined modulation scheme, and outputs modulation symbols (hereinafter referred to as "DPCH modulation symbols"). A Quadrature Phase Shift Keying (QPSK) scheme and a Binary Phase Shift Keying (BPSK) scheme can be used as the predetermined modulation scheme. The DPCH modulation symbols are input to the transmission power allocater 502. The transmission power allocater 502 allocates transmission power for the DPCH modulation symbols. In this case, an additional power offset selected based on the control information is reflected in the transmission power. The transmission power-allocated DPCH modulation symbols are converted into an analog signal and amplified by the DAC/AMP 508, and then provided to an antenna.

In an operation of generating the transmission power, all additional power offsets that can be selected based on control information are input to the multiplexer 504. In FIG. 5, it is assumed that 0, PO3_INFO1 and PO3_INFO2 are input as the additional power offsets. Also, control information for selecting one of the additional power offsets is input to the multiplexer 504. The control information, as described above, corresponds to a pilot pattern of pilot bits inserted in a DPCH.

It is assumed in FIG. 5 that one of the 3 types of control information is input. The 3 types of control information include control information indicating absence of control information, first control information and second control information. Therefore, the multiplexer 504 selects one of the additional power offsets according to the control information. For example, the multiplexer 504 selects PO3_INFO1 as the additional power offset if the first control information is received, and the multiplexer 504 selects PO3_INFO2 as the additional power offset if the second control information is received. In addition, the multiplexer 504 selects 0 as the additional power offset if the control information indicating absence of control information is received. In this way, it is possible to allocate an additional power offset of a pilot field based on the type of control information carried by the pilot field of a DPCH.

The additional power offset from the multiplexer 504 is input to the adder 506. The adder 506 adds the additional power offset and PO3, and outputs the addition result as a power offset PO_PILOT for allocating the transmission power. The PO3 refers to a basic power offset previously allocated to the DPCH. The multiplexer 504 and the adder 506 comprise a structure for generating a power offset PO_PILOT, and this structure is defined as a power offset generator.

B-2. Structure and Operation of Receiver

With reference to an accompanying drawing, a detailed description will now be made of a structure and operation of a receiver according to an embodiment of the present invention.

FIG. 4 is a block diagram illustrating a structure of a receiver according to an embodiment of the present invention. The receiver is comprised of a DPCH demodulator 400, a pilot field extractor 402, a DPCH reception power measurement and TPC bit generation part 406, and a control information extractor 404.

Referring to FIG. 4, a reception signal is input to the DPCH demodulator 400. The DPCH demodulator 400 demodulates the reception signal into a DPCH signal. The DPCH signal is provided to the pilot field extractor 402, and the DPCH reception power measurement and TPC bit generation part 406. The pilot field extractor 402 extracts a pilot signal from a pilot field of a DPCCH signal comprising the DPCH signal. The pilot signal is provided to the control information extractor 404. The control information extractor 404 extracts control information based on a pilot pattern of the pilot signal. To this end, the control information extractor 404 should know all pilot patterns generated according to the control information in the transmitter. That is, the pilot patterns independently assigned to the types of control information should be shared by the transmitter and the receiver. The control information extracted by the control information extractor 404 is provided to the DPCH reception power measurement and TPC bit generation part 406.

The DPCH reception power measurement and TPC bit generation part 406 measures reception power of the DPCH using a pilot signal included in the DPCH signal. The DPCH reception power measurement and TPC bit generation part 406 compares the reception power with a target reception power, and generates a TPC bit according to the comparison result. Here, PO3_INFO1 or PO3_INFO2 can be reflected in the target reception power as an additional power offset, or no additional power offset can be reflected in the target reception power. Determining whether to reflect the additional power offset is made based on the control information.

FIG. 6 is a detailed block diagram illustrating a structure of the DPCH reception power measurement and TPC bit generation part 406 illustrated in FIG. 4. The DPCH reception power measurement and TPC bit generation part 406 comprises a DPCH reception power measurer 600, a comparator 602, a multiplexer 604, a target reception power setter 606, and a TPC bit generator 608.

Referring to FIG. 6, a DPCH signal is input to the DPCH reception power measurer 600. The DPCH reception power measurer 600 measures reception power of the DPCH using pilot signals included in the DPCH signal. The measured reception power is input to the comparator 602. The comparator 602 compares the measured reception power with a target reception power. Here, an additional power offset selected based on the control information is reflected in the target reception power. The comparator 602 provides the comparison result to the TPC bit generator 608. The TPC bit generator 608 generates a TPC bit for controlling transmission power of the transmitter according to the comparison result.

In an operation of generating the target reception power, all additional power offsets that can be selected based on the control information are input to the multiplexer 604. In FIG. 6, it is assumed that 0, PO3_INFO1 and PO3_INFO2 are input as the additional power offsets. Here, the additional power offsets should be identical to the additional power offsets used to determine transmission power in the transmitter. Also, control information for selecting one of the additional power offsets is input to the multiplexer 604. The control information, as described above, corresponds to a pilot pattern of a pilot signal inserted in a DPCH.

It is assumed in FIG. 6 that one of the 3 types of control information is input. The 3 types of control information include control information indicating absence of control information, first control information and second control information. Therefore, the multiplexer 604 selects one of the additional power offsets according to the control information. For example, the multiplexer 604 selects PO3_INFO1 as the additional power offset if the first control information is received, and the multiplexer 604 selects PO3_INFO2 as the additional power offset if the second control information is received. In addition, the multiplexer 604 selects 0 as the additional power offset if the control information indicating absence of control information is received. In this way, it is possible to allocate the additional power offset added to the pilot signal based on the type of control information extracted by a pilot pattern of the pilot signal. The additional power offset from the multiplexer 604 is input to the target reception power setter 606. The target reception power setter 606 adds the additional power offset to a basic target reception power, and outputs the addition result as a target reception power. The basic target reception power refers to a target reception power that was used for generating TPC bits when no additional power offset was applied to a pilot pattern. The target reception power set based on the control information can be defined as shown in Table 3.

TABLE 3

| Type of control information | Target reception power [dB] |
|---|---|
| Absence of control information | Basic target reception power |
| Fist control information | Basic target reception power + PO3_INFO1 |
| Second control information | Basic target reception power + PO3_INFO2 |

The embodiment of the present invention has been described with reference to a target reception power being set using an additional power offset based on control information. Hitherto, a description has been made of a method for applying an additional power offset used for power control to a target reception power. Also, in another embodiment of the present invention, there is an alternative method for fixing a target reception power, and adaptively adjusting a measured reception power by applying an additional power offset. The multiplexer 604 and the target reception power setter 606 constitute a structure for generating a target reception power, and this structure is defined as a target reception power generator.

As described above, the transceiver according to the embodiment of the present invention is implemented such that different transmission powers can be determined based on control information, for the following reason. That is, because performance requirements can be different according to the types of control information, it is efficient to apply different power offsets rather than applying the same power offset. For example, when ACK/NACK/MISS is transmitted with a pilot field as control information, because NACK requires the highest reception reliability, the highest power offset is selected for the NACK. An additional power offset selected for ACK is lower than an additional power offset selected for the NACK, and an additional power offset having a value of 0 can be selected for MISS. In addition, when the number of types of control information is 3, the embodiment of the present invention can be extended by setting pilot patterns associated thereto and additional power offsets corresponding to the pilot patterns according to reliabilities of the control information.

B-3. Signaling

With reference to an accompanying drawing, a detailed description will now be made of a signaling operation for transmitting additional power offset information from a Node B to a UE according to an embodiment of the present invention.

In an asynchronous mobile communication system for an embodiment of the present invention, additional power offset information based on control information used in a transmission side and a reception side is set in a serving radio network controller (SRNC). The set additional power offset information is delivered to a Node B, a UE and a drift radio network controller (DRNC). In order to deliver the additional power offset information to the Node B, Iub signaling is used, and in order to deliver the additional power offset information to the UE, a Uu signaling is used. Further, in order to deliver the additional power offset information to the DRNC, an Iur signaling is used. In a situation where there are a plurality of radio links as in when the UE is performing a soft handover, different additional power offsets can be separately set for the radio links.

The Iub signaling is a NBAP message, as a control-plane message, used when an RNC establishes/changes/releases an uplink/downlink DPCH of a particular UE to a Node B, or a control frame, as a user-plane message, used when an RNC frequently changes a parameter of an uplink/downlink DPCH established in a particular UE to a Node B.

The Iur signaling is a RNSAP message, as a control-plane message, used when an SNRC establishes/changes/releases an uplink/downlink DPCH of a particular UE to a DRNC, or a control frame, as a user-plane message, used when an SRNC frequently changes a parameter of an uplink/downlink DPCH established in a particular UE to a DRNC.

The Uu signaling is a radio resource control (RRC) message used by an SNRC to transmit a control message in a particular UE.

Now, a description will be made of each signaling procedure for allowing additional power offset information to be shared in a mobile communication system. Because the Iur signaling is identical to the Iub signaling in structure, a description thereof will be omitted.

Iub Signaling

In an embodiment of the present invention, in order to deliver additional power offset information over Iub, an RNC adds the additional power offset information to an NBAP message used for establishing/changing an uplink/downlink DPCH of a UE. The existing NBAP message includes a Radio Link Setup Request message, a Radio Link Addition Request message, a Radio Link Reconfiguration Request message, and a Radio Link Reconfiguration Prepare message. An example of an NBAP message for an embodiment of the present invention is illustrated in Table 4.

TABLE 4

| IE/Group Name | Comments |
| --- | --- |
| RL Information | Set of parameters separately set for radio links |
| >RL ID | Radio link identifier |
| >PO3_INFO1 | Additional power offset for pilot bits of DPCCH when first control information is transmitted |
| >PO3_INFO2 | Additional power offset for pilot bits of DPCCH when second control information is transmitted |

Table 4 illustrates a format of a Radio Link Setup Request message (or Radio Link Addition Request message, Radio Link Reconfiguration Request message, Radio Link Reconfiguration Prepare message). As illustrated in Table 4, the Radio Link Setup Request message (or Radio Link Addition Request message, Radio Link Reconfiguration Request message, Radio Link Reconfiguration Prepare message) includes RL Information indicating a group of parameters separately set for respective radio links. In an embodiment of the present invention, PO3_INFO1 and PO3_INFO2 are added to the RL Information as additional power offset information. This corresponds to a case where two types of control information are transmitted. Generally, when N types of control information are transmitted, N pieces of additional power offset information are added to the RL Information of the Radio Link Setup Request message (or Radio Link Addition Request message, Radio Link Reconfiguration Request message, Radio Link Reconfiguration Prepare message).

Figure 7:
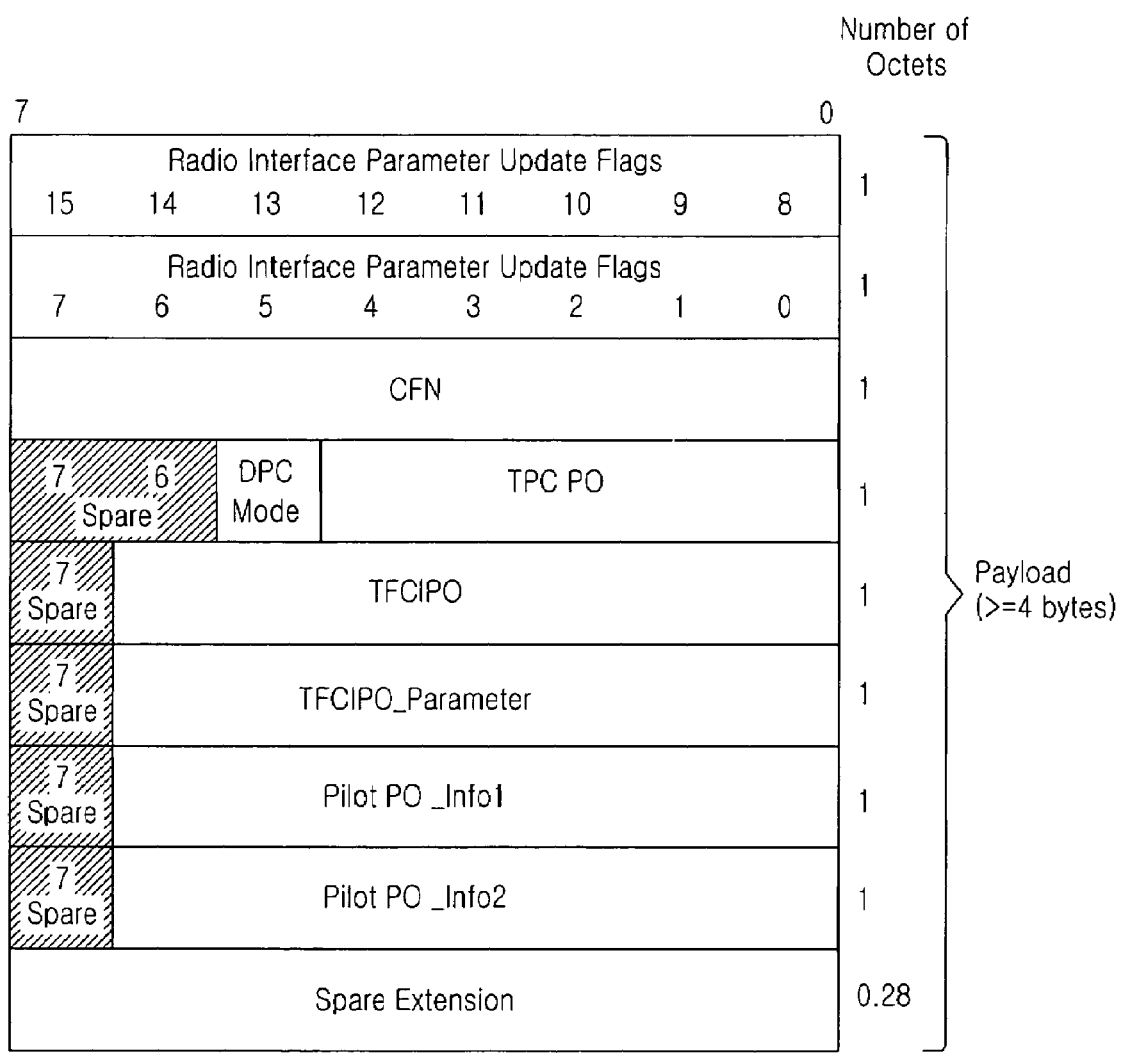
FIG. 7 is a diagram illustrating a format of an Iub control frame according to an embodiment of the present invention.

As an another example, in order to deliver additional power offset information over Iub, an RNC adds the additional power offset information to a Radio Link Parameter Update control frame used for signaling a power offset of a downlink DPCH which is frequently changed. A detailed example of the message is illustrated in FIG. 7. The message illustrated in FIG. 7 has a format of a Radio Link Parameter Update control frame.

Referring to FIG. 7, when a corresponding flag bit is set to '1', it indicates that a parameter for an additional power offset for first control information is included. When the corresponding flag bit is set to '2', it indicates that a parameter for an additional power offset for second control information is included. In the format shown in FIG. 7, Pilot PO_INFO1 and Pilot PO_INFO2 are added to an end of the existing Radio Link Parameter Update control frame. The Pilot PO_INFO1 is the same parameter as the PO3_INFO1 described above, and the Pilot PO_INFO2 is the same parameter as the PO3_INFO2 described above. The number of bits allocated to the Pilot PO_INFO1 and the Pilot PO_INFO2 should be appropriately determined according to the amount of additionally required additional power offset.

Uu Signaling

In an embodiment of the present invention, in order to deliver additional power offset information over Uu, an RNC adds the additional power offset information to an RRC message used for establishing/changing an uplink/downlink DPCH of a UE. The existing RRC message includes a Radio Bearer Setup message, a Transport Channel Reconfiguration message, and an Active Set Update message. An example of an RRC message for an embodiment of the present invention is illustrated in Table 5.

TABLE 5

| IE/Group Name | Comments |
| --- | --- |
| Downlink information for each radio link | Set of parameters separately set for radio links |
| >Primary CPICH info | Radio link identification |
| >PO3_INFO1 | Additional power offset for pilot bits of DPCCH when first control information is transmitted |
| >PO3_INFO2 | Additional power offset for pilot bits of DPCCH when second control information is transmitted |

Table 5 illustrates a format of a Radio Bearer Setup message (or Transport Channel Reconfiguration message, Active Set Update message). As illustrated in Table 5, the Radio Bearer Setup message (or Transport Channel Reconfiguration message, Active Set Update message) includes 'Downlink DPCH info for each RL' indicating a group of parameters separately set for respective radio links. In the embodiment of the present invention, PO3_INFO1 and PO3_INFO2, which are additional power offset information, are added to the 'Downlink DPCH info for each RL'.

As can be understood from the foregoing description, in a mobile communication system that transmits control information using an existing pilot field, an embodiment of the present invention allocates an additional power offset to the pilot field to reduce an error rate of the control information, thereby enabling efficient power control. Therefore, this embodiment of the present invention secures accurate control information and a correct power control operation, contributing to performance improvement.

While the invention has been shown and described with reference to a certain preferred embodiment thereof, it should be understood by those skilled in the art that various changes in form and details may be made therein without departing from the spirit and scope of the invention as defined by the appended claims.

What is claimed is:

1. A method for controlling transmission power in a transmitter of a mobile communication system that inserts a pilot pattern selected based on control information into a pilot field of a physical channel before transmission, the method comprising the steps of:
    selecting an additional power offset corresponding to the control information;
    allocating transmission power based on the additional power offset; and
    transmitting a signal on the physical channel with the transmission power, wherein the additional power offset is set according to reception reliability of the control information.

2. The method of claim 1, wherein the additional power offset does not exist in the absence of the control information.

3. The method of claim 1, wherein additional power offsets independently assigned to respective types of the control information are set and provided by a radio network controller.

4. A method for performing power control by a receiver in a mobile communication system in which a pilot pattern selected based on control information is inserted into a pilot field of a physical channel before being transmitted, the method comprising the steps of:
    extracting control information based on the pilot pattern inserted into the pilot field of a signal on the physical channel;
    selecting an additional power offset corresponding to the control information, and setting a target reception power based on the selected additional power offset; and
    comparing a reception power measured based on the physical channel signal with the target reception power, and generating a transmit power control (TPC) bit according to the comparison result, wherein the TPC bit is transmitted to a transmitter so that power control on the physical channel is performed based on the TPC bit.

5. The method of claim 4, wherein the target reception power is set by the sum of a basic target reception power used in the absence of the control information and the additional power offset.

6. The method of claim 4, wherein additional power offsets independently assigned to respective types of the control information are set and provided by a radio network controller.

7. An apparatus for controlling transmission power of a signal on a physical channel in a transmitter of a mobile communication system that inserts a pilot pattern selected based on control information into a pilot field of the physical channel before transmission, the apparatus comprising:
    a power offset generator for selecting an additional power offset corresponding to the control information among selectable additional power offsets, and generating a power offset based on the selected additional power offset; and
    a transmission power allocater for allocating transmission power based on the power offset, wherein the physical channel signal is transmitted with the transmission power, and the additional power offset is set according to reception reliability of the control information.

8. The method of claim 7, wherein the power offset generator generates the power offset without considering the additional power offset in the absence of the control information.

9. The method of claim 7, wherein the power offset generator comprises:
    a multiplexer for receiving the control information and all of selectable additional power offsets, and selecting an additional power offset corresponding to the control information among the selectable additional power offsets; and
    an adder for generating the power offset by adding the selected additional power offset to a basic power offset generated in the absence of the control information.

10. The method of claim 7, wherein additional power offsets independently assigned to respective types of the control information are set and provided by a radio network controller.

11. An apparatus for performing power control based on a signal on a physical channel by a receiver in a mobile communication system in which a pilot pattern selected based on control information is inserted into a pilot field of the physical channel before being transmitted, the apparatus comprising:
    a control information extractor for extracting control information based on the pilot pattern inserted into the pilot field of the physical channel signal; and
    a physical channel reception power measurement and transmit power control (TPC) bit generation part for setting a target reception power based on an additional power offset selected based on the control information, comparing a reception power measured based on the physical channel signal with the target reception power, and generating a TPC bit according to the comparison result, wherein the TPC bit is transmitted to a transmitter so that power control on the physical channel is performed based on the TPC bit.

12. The apparatus of claim 11, wherein the physical channel reception power measurement and TPC bit generation part comprises:
   a target reception power generator for selecting an additional power offset corresponding to the control information, and generating a target reception power considering the additional power offset;
   a physical channel reception power measurer for receiving the physical channel signal and measuring a reception power of the received physical channel signal;
   a comparator for comparing the measured reception power with the target reception power; and
   a TPC bit generator for generating a TPC bit based on the comparison result.

13. The apparatus of claim 12, wherein the target reception power generator comprises:
   a multiplexer for receiving the control information and all of selectable additional power offsets, and selecting an additional power offset corresponding to the control information among the selectable additional power offsets; and
   a target reception power setter for setting the target reception power based on the sum of a basic target reception power used in the absence of the control information and the additional power offset.

14. The apparatus of claim 11, wherein additional power offsets independently assigned to respective types of the control information are set and provided by a radio network controller.

15. An apparatus for performing power control based on a signal on a physical channel by a receiver in a mobile communication system in which a pilot pattern selected based on control information is inserted in a pilot field of the physical channel before being transmitted, the apparatus comprising:
   a control information extractor for extracting control information based on the pilot pattern inserted in the pilot field of the physical channel signal;
   a target reception power generator for selecting an additional power offset corresponding to the control information, and generating a target reception power based on the additional power offset;
   a comparator for comparing a reception power measured based on the physical channel signal with the target reception power; and
   a transmit power control (TPC) bit generator for generating a TPC bit according to the comparison result.

16. The apparatus of claim 15, wherein the target reception power generator comprises:
   a multiplexer for receiving the control information and all of selectable additional power offsets, and selecting an additional power offset corresponding to the control information among the selectable additional power offsets; and
   a target reception power setter for setting the target reception power based on the sum of a basic target reception power used in the absence of the control information and the additional power offset.

17. The apparatus of claim 15, wherein additional power offsets independently assigned to respective types of the control information are set and provided by a radio network controller.

18. A method for performing power control by a receiver in a mobile communication system in which a pilot pattern selected based on control information is inserted in a pilot field of a physical channel before being transmitted, the method comprising the steps of:
   extracting control information based on the pilot pattern inserted in the pilot field of a signal on the physical channel;
   selecting an additional power offset corresponding to the control information, and adjusting a reception power measured based on the physical channel signal and the selected additional power offset; and
   comparing the adjusted reception power with a target reception power, and generating a transmit power control (TPC) bit according to the comparison result,
   wherein the TPC bit is transmitted to a transmitter so that power control on the physical channel is performed based on the TPC bit.

19. An apparatus for performing power control based on a signal on a physical channel by a receiver in a mobile communication system in which a pilot pattern selected based on control information is inserted in a pilot field of the physical channel before being transmitted, the apparatus comprising:
   a control information extractor for extracting control information based on the pilot pattern inserted in the pilot field of a signal on the physical channel; and
   a physical channel reception power measurement and transmit power control (TPC) bit generation part for adjusting a reception power measured based on the physical channel signal and an additional power offset selected based on the control information, comparing the adjusted reception power with a target reception power, and generating a TPC bit according to the comparison result;
   wherein the TPC bit is transmitted to a transmitter so that power control on the physical channel is performed based on the TPC bit.

* * * * *